United States Patent [19]
Richards et al.

[11] Patent Number: 5,871,231
[45] Date of Patent: Feb. 16, 1999

[54] LOW AGGRESSIVITY VARIABLE-VOLUME VARIABLE-INFLATION AIR BAG SYSTEM

[75] Inventors: Marvin K. Richards, Gilbert; Gershon Yaniv, Scottsdale, both of Ariz.; David J. Romeo, Alpine, Wyo.

[73] Assignee: Simula Inc., Phoenix, Ariz.

[21] Appl. No.: 762,219

[22] Filed: Dec. 9, 1996

Related U.S. Application Data

[60] Provisional application No. 60/019,172, Jun. 5, 1996.

[51] Int. Cl.$^6$ .................................................. B60R 21/32
[52] U.S. Cl. ........................ 280/735; 280/743.1; 180/268
[58] Field of Search .................................... 280/735, 736, 280/743.1; 180/268

[56] References Cited

U.S. PATENT DOCUMENTS

| | | | |
|---|---|---|---|
| 3,879,056 | 4/1975 | Kawashime et al. | 280/743.2 |
| 3,966,224 | 6/1976 | Campbell et al. | 280/735 |
| 3,990,726 | 11/1976 | Oka et al. | 280/729 |
| 4,018,457 | 4/1977 | Marlow | 280/735 |
| 4,620,721 | 11/1986 | Scholz et al. | 280/735 |
| 4,984,651 | 1/1991 | Grosch et al. | 280/735 |
| 5,074,583 | 12/1991 | Fujita et al. | 280/735 |
| 5,209,510 | 5/1993 | Mamiya | 280/735 |
| 5,240,283 | 8/1993 | Kishi et al. | 280/735 |
| 5,282,646 | 2/1994 | Melvin et al. | 280/729 |
| 5,400,487 | 3/1995 | Gioutsos et al. | 280/735 |
| 5,411,289 | 5/1995 | Smith et al. | 280/735 |
| 5,460,405 | 10/1995 | Faigle et al. | 280/735 |
| 5,546,307 | 8/1996 | Mazur et al. | 280/735 |
| 5,560,649 | 10/1996 | Sanderholm et al. | 280/743.1 |
| 5,599,040 | 2/1997 | Takahashi et al. | 280/743.1 |

*Primary Examiner*—Daniel D. Wasil
*Attorney, Agent, or Firm*—Crowell & Moring LLP

[57] ABSTRACT

An air bag system for protecting an occupant in a motor vehicle against injuries resulting from a crash. The system is distinguished by an air bag with releasable partitioning, preferably breakaway stitching, that provides a variable-size inflatable volume and by a means to control the level of inflation. These features allow the present invention to provide optimum protection regardless of whether the occupant is restrained by a seat belt and regardless of whether the crash speed at impact is moderate or severe. The air bag of the invention accommodates the occupant who is wearing a seat belt restraint by inflating to a relatively small inflated volume with a varying internal pressure depending on the crash speed. It accommodates the occupant who is not belted and is in a vehicle traveling 21 mph or faster at the moment of impact by inflating to a larger inflated volume. Thus, the invention provides protection that is appropriate to and optimal for specific crash conditions. The releasable partitioning also helps control the forcefulness, or aggressivity, of the deployment. Additionally, the design minimizes rebound energy imparted to the occupant by the selection of air bag size and fill. Further, the present invention, in most crash scenarios, provides an unvented air bag which eliminates problems associated with venting inflation gas into the occupant compartment.

48 Claims, 6 Drawing Sheets

LOW AGGRESSIVITY VARIABLE-VOLUME VARIABLE-INFLATION AIR BAG SYSTEM

The present application claims the benefit of the filing date of U.S. Provisional Application Ser. No. 60/019,172, filed on Jun. 5, 1996.

BACKGROUND

1. Field of the Invention

The present invention relates to an air bag system that protects an occupant of a motor vehicle in the event of a crash. More particularly, it relates to an air bag system that provides a variable-size inflatable volume and a variable-output gas supply to produce optimal protection for the occupant regardless of whether he/she is wearing a seat belt and regardless of whether the crash speed is moderate or high.

2. Background of the Invention

U.S. Federal Government safety regulations (Federal Motor Vehicle Safety Standard (FMVSS) 208) require that motor vehicle air bags protect unbelted front seat occupants in frontal barrier crashes where the vehicle is traveling at 30 mph at impact. In order to do so, air bags must be relatively large, hard, and inflate rapidly. Collectively these characteristics describe an air bag that is referred to herein as an aggressive air bag. Although required by U.S. law, on some occasions, aggressive air bags can cause serious or even fatal injuries.

This is all the more unfortunate because the U.S. government's own National Accident Statistic Study (NASS) shows that 98 percent of accidents causing air bag deployment occur at crash speeds at 30 mph or below. (NASS is an ongoing statistical study of vehicle accidents conducted by the National Highway Traffic Safety Administration (NHTSA) of the U.S. Department of Transportation.) Furthermore, the study shows 80 percent of air bag deployments occur below 20 mph. In addition, it points out that approximately 75 percent of front seat occupants now wear seat belts. Thus, only 0.5%, of the population (assuming that only 25% of the crash victims for accidents occurring at crash speeds of 30 mph are not wearing seat belts) actually need an air bag that complies with the current government standard. Everyone else is being subjected unnecessarily to an aggressive air bag deployment.

The air bag system that is installed in most of the vehicles currently sold in the United States does not distinguish between, or accommodate, the different protection needs of the occupant who is wearing a seat belt and one who is not. Instead, because of government safety standards, it is constructed purposefully to protect the unrestrained occupant in a severe crash from hitting the car interior by aggressively deploying a large air bag at a high inflation rate.

An aggressive air bag can protect the occupant from hitting a structural part of the vehicle's interior. However, to do so he/she will very likely be struck by the air bag, and the potential for abrasions or more serious injuries is high. If restrained with a seat belt, the occupant is less at risk but often is still forcibly struck by the deploying bag. If unrestrained, the occupant travels faster and more forward before being struck by the deploying bag and experiences even greater harmful effects of deployment forces.

Various means have been devised to attempt to overcome the potential hazards associated with the use of large, high aggressivity air bags. Some of these devices are as follows:

U.S. Pat. No. 3,879,056 discloses an air bag with a belt-like restraining member that limits the extent of deployment When the occupant impacts the air bag, the restraining member breaks, which reduces the bag's air pressure and the rebounding force imparted to the occupant.

U.S. Pat. No. 3,990,726 discloses an air bag with a seam that opens when the occupant hits the air bag, thus lowering bag pressure and rebounding force.

U.S. Pat. No. 5,240,283 discloses an air bag with attached auxiliary bags which inflate with gas that is forced into them from the primary bag when the occupant strikes the primary bag.

U.S. Pat. No. 5,282,646 discloses an air bag with a valve that controls inflation of two internal chambers. The chambers communicate via two openings. The first is always open and permits immediate flow of inflation gas from the first chamber, which is coupled to the inflator, to the second chamber, which is nearer the occupant. The other opening has a mesh covering and is normally closed by a flap that is also attached to the occupant-contacting wall. As the second chamber expands via inflation through the first opening, the occupant-contacting wall moves toward the occupant. When this wall reaches a predetermined expansion, the wall pulls the valve flap open and exposes the second opening. The air bag continues to inflate to its final volume; that is, to the extent the occupant-contacting wall can move toward the occupant.

All of the above patents relate to air bags that can significantly change volume upon occupant loading but which have a fixed-volume gas generator supply. Because of their fixed-volume gas supply, these air bags can either adequately inflate the first volume or the bag's largest volume, but not both. If the gas in an air bag of this type of system adequately inflates the first volume and, upon occupant loading, presents a larger volume, the air bag will behave as if the first volume ruptured which would leave the occupant effectively unrestrained. Hence an air bag system constructed in this manner could only open in such a way that the gas would vent into the larger volume upon occupant impact at a rate equivalent to that of typical vented air bag designs in order to be an effective restraint. To be effective, a single gas generator air bag system can have only a single-volume air bag. Of course, if small changes in volume were allowed, a single gas generator could be used, but these small changes could never be used to accommodate differences in the effect of occupant loading that occur in belted versus unbelted occupant or moderate-speed crash versus high-speed crash situations. The above-cited patents pertain to what are hereinafter referred to as variable-volume, fixed-inflation designs.

U.S. Pat. No. 5,074,583 discloses a passenger-side air bag system including a seating condition sensor that detects the temperature of the passenger compartment and seating condition of a passenger with respect to seat position, reclining angle, passenger size, passenger posture, and seat belt usage. In accordance with the sensed seating condition, a control unit determines the timing of the inflation, gas pressure in the air bag, quantity of gas in the air bag, and the position of the air bag in relation to the occupant. This system has the drawbacks of being an extraordinarily heavy, complex, and costly system.

U.S. Pat. No. 5,411,289 discloses an air bag system with a multiple-level gas generation source that inflates the air bag with a selected level of gas. The gas level and inflation sequence times are controlled by an electronic control unit which is responsive to attached temperature, seat belt, and acceleration sensors.

The two patented systems cited immediately above provide varying gas generator output; however, there is no provision for varying air bag volume. Although they provide some adjustment in aggressivity, they are not designed to cover vast differences in required protection as occur, for instance, with a 12 mph crash speed with belted occupant versus a 30 mph crash speed with unbelted occupant. The above-cited patents pertain to what are hereinafter referred to as fixed-volume, variable-inflation designs.

In summary, all of the above-cited inventions attempt to address the problems associated with the large, high aggressivity air bag by varying degrees and means. However, an air bag system is needed that fully addresses those problems and provides optimum protection regardless of whether the occupant is wearing a seat belt and whether the crash speed is moderate or severe. Further, the needs should be met with an air bag system that is simple in construction, economical to install, and compatible with existing equipment.

SUMMARY OF THE INVENTION

The present invention is a variable-volume, variable-inflation air bag system for protecting a vehicle occupant in the event of a crash. It provides an air bag restraint system which, in terms of aggressivity, responds in accordance with the crash conditions in order to provide optimum occupant protection. The system responds in this manner through the use of an air bag that can inflate to two different volumes and gas generator source(s) that can provide at least two levels of inflation. The "normal" FMVSS 208 air bag will be deployed only as needed which is 5 percent of the time, as shown below.

Injuries that occur as a result of aggressive air bag deployment can be nearly eliminated by this air bag system. It uses two discriminators to determine the nature of deployment: seat belt usage and crash speed threshold. Using figures derived from the above-cited study, the following crash population matrix shows the percentage of crashes that occur with respect to a speed threshold greater than 12 mph and a threshold greater than 20 mph for belted and unbelted occupants.

| Seat belt engaged? | Speed threshold | |
| --- | --- | --- |
| | >12 mph, but ≦20 mph | >20 mph |
| Yes | 60% | 15% |
| No | 20% | 5% |

The air bag is made of impermeable material suitable for air bag usage, which is well known in the art. Its large volume size is typical of air bags designed for protecting unrestrained occupants and sold in the U.S. That is, the air bag for driver-side use has an uninflated diameter of approximately 27 to 30 inches and holds approximately 60 to 80 liters of inflation gas in its full inflation mode. The air bag comprises front and rear panels that are joined along their peripheral edges by a means that creates a high-strength seam. High-strength stitching is the preferred means; however, the panels can also be woven, glued, or welded using high-frequency welding. The rear panel has a centrally located opening that is reinforced and is adapted for attachment to an inflation system.

The air bag of the present invention is partitioned with a releasable means of attachment, such as an expanse of breakaway stitching, that is applied along the inner periphery of the air bag. This partitioning provides a separate inflatable area in the central portion of the air bag that has an inflated volume that is approximately 50 percent smaller than the inflated volume of the entire air bag. The provision of this smaller volume and the releasable partitioning, together with variable gas generation, is key to the invention's low aggressivity and its ability to protect the occupant in a range of crash circumstances. For the purpose of clarity, the central inflatable portion of the invention is referred herein as the small inflated or inflatable volume, and the entire inflatable area of the invention is referred herein as the large inflated or inflatable volume.

Breakaway stitching is the preferred means to partition the air bag. However, other releasable means including weaving, gluing, high-frequency welding, hook and loop fastening, snaps, tongue and groove fastening, and tear fabric can be used and, additionally, pleats can be incorporated. For the purpose of clarity, the releasable means is identified hereinafter as breakaway stitching.

Two preferred embodiments of the present invention are presented herein. The components and arrangements of both embodiments enable the air bag to deploy in a manner such that it provides the benefits of variable-size inflatable volume as well as variable gas supply. The following matrix, which incorporates figures from the above-cited study, defines the possible air bag deployments for the present invention which employs seat belt usage and crash speed threshold as discriminators.

| Seat belt engaged? | Speed threshold | |
| --- | --- | --- |
| | >12 mph, but ≦20 mph | >20 mph |
| Yes | Small Bag<br>40% gg<br>(accounts for 60% of crashes) | Small Bag<br>60% gg<br>(accounts for 15% of crashes) |
| No | Small Bag<br>60% gg<br>(accounts for 20% of crashes) | Large Bag<br>100% gg<br>(accounts for 5% of crashes) |

Note:
The % gg refers to the percent of total inflation gas available that is generated as a result of gas generator selection or gas generator selection with open bypass.

A first preferred embodiment of the present invention includes a bypass valve, gas generator, seat belt usage sensor, crash sensor, and signal processor. The gas generator can produce enough gas to inflate the large inflatable volume of the air bag. However, inputs from the seat belt usage sensor and crash sensor actually determine the rate and amount of inflation gas that flows into the air bag. This system operates as described below.

Anytime the occupant engages the seat belt, the seat belt usage sensor sends a signal to the signal processor which sends a signal to the bypass valve to open. Conversely, anytime the occupant disengages the seat belt, the seat belt sensor sends a signal to the signal processor that signals the valve to close. In the event of a crash, which is generally identified by the crash detector as a change in acceleration over a set time frame that exceeds a specific threshold, the crash detector sends a signal to the gas generator that initiates gas generation. At the same time, the crash detector sends a signal(s) to the signal processor that identifies the crash severity, i.e., that indicates the speed at which the crash occurred or that indicates whether the crash occurred at, above or below several speed thresholds. The speed indication may also be obtained from a separate sensor, such as the vehicle's speedometer. The signal processor may also be monitoring the speed of the vehicle, e.g., using input from the vehicle's speedometer system, such that it continually updates a register containing the vehicle speed. The signal processor evaluates the input from the crash detector (and, if necessary, from a separate speed indicator), and the latest input from the seat belt usage sensor. The processor response depends on the specific crash event as described below.

In the event that the crash speed is greater than 12 mph but below 21 mph, herein termed moderate, and the occupant is belted, the signal processor sends no signal to the bypass valve, allowing it to remain fully open. Gas flows simultaneously out through the bypass valve and into the central portion of the air bag, inflating its small volume. Approximately 40 percent of the gas generated by the generator flows into the air bag and 60 percent flows out through the bypass valve. The inflated portion of the air bag is relatively small. Thus, in this situation, which describes 60 percent of all crashes, according to the above-cited study, it is unlikely that the deploying air bag will impact the occupant or that the occupant will load the air bag to any significant degree. However, should overload occur, gas will vent from the air bag out through the bypass valve port.

In the event that the crash speed is greater than 20 mph, herein termed severe, and the occupant is belted or the crash speed is below 21 mph but greater than 12 mph and the occupant is not belted, the signal processor sends a signal that causes the bypass valve to be partially open. In these crash situations, with encompass 35 percent of all crashes, according to the above-cited study, approximately 60 percent of the gas generated flows into the air bag and 40 percent flows out through the bypass valve.

Inflation gas that flows out through the bypass valve is discharged outside the occupant compartment. It may, for example, be discharged through the fire wall into the engine bay. An open or partially open bypass valve limits the pressure and quantity of gas flowing into the air bag. This prevents the breakaway stitching from failing during inflation and allows only the small inflatable volume of the air bag to inflate.

In the event that the crash speed is greater than 20 mph and the occupant is unbelted, the signal processor sends no signal to the bypass valve. The valve remains closed and, of course, no gas bypasses. Instead, 100 percent of the gas generated flows into the central portion of the air bag, breaks the breakaway stitching, and inflates the air bag's large inflatable volume. When the occupant impacts the air bag, gas vents through openings that are located outward of the breakaway stitching.

A second preferred embodiment of the present invention comprises two gas generators (or a dual-level gas generator), a crash sensor, seat belt usage sensor, and a signal processor. The following description assumes that the two gas generators have different outputs, preferably approximately 40 percent and 60 percent of the total output, so that the small central volume can be inflated to soft or hard conditions and so that together the two generators will produce enough gas to fully inflate the large inflatable volume.

Anytime the occupant engages or disengages the seat belt, the seat belt sensor sends a signal to the signal processor. In the event of a crash, the crash detector sends a signal(s) to the signal processor that identifies the crash severity. The signal processor evaluates the input from the crash detector and the latest input from the seat belt usage sensor. The processor response depends on the specific crash event as described below.

If the occupant is belted and the crash speed threshold is moderate, the signal processor will signal the smaller gas generator to initiate inflation. If the occupant is belted and the crash speed threshold is severe, or if the occupant is unbelted and the crash speed threshold is moderate, the signal processor will signal the larger gas generator to initiate inflation. If the occupant is unbelted and the crash speed threshold is severe, the processor will signal both gas generators to initiate inflation. Only when both gas generators are activated will the gas break the breakaway stitching and inflate the air bag's large inflatable volume.

The most distinguishing features and advantages of the invention are as follows. It provides a variable-size inflatable volume and a variable-output gas generation system to correctly accommodate the different protection needs of the occupant who is wearing a seat belt and the one who is not in both moderate and severe crashes. The use of breakaway stitching allows the capacity of the entire air bag to be always available to the occupant if needed depending on crash speed and seat belt usage. The air bag deploys in a low aggressive manner primarily because of two features: the partitioned inflatable central portion controlled by breakaway stitching and the use of a variable gas supply. The air bag either stops inflating at a small inflated volume, roughly 50 percent of the inflated volume of the entire air bag at a relatively low or high pressure, or it inflates to its large inflated volume in a controlled manner through the use of breakaway stitching. The small inflated volume displays low aggressivity by virtue of size and gas generator output. The breakaway stitching minimizes the air bag's aggressivity by decreasing the rapidity and limiting the forcefulness of the deployment when the large inflatable volume is inflating. The same factors that minimize the aggressivity also limit the rebound force that the air bag can impart to the occupant. Low aggressivity and low rebound force result in fewer injuries related to air bag deployment.

The unvented construction of the smaller volume bag, which accident statistics show will be the deployed restraint with the use of the present invention 95 percent of the time, provides additional advantages. It eliminates air contamination of the vehicle's interior due to the release of inflation gas. This makes it especially practical for use in cases where changes in air quality or pressure can be critical. It also provides protection to the occupant in vehicles with small interiors in which the vented "smoke" of a gas generator could cause an egress problem.

Accordingly, it is an object of the present invention to provide optimal protection for a vehicle occupant regardless of whether he/she is wearing a seat belt or the crash speed is moderate or severe.

Another object of the present invention is to provide a protective vehicle air bag system that minimizes the kinetic energy imparted to the occupant during all deployment situations.

Another object of the present invention is to provide a protective vehicle air bag system that minimizes the rebound energy imparted to the occupant upon impacting the air bag in the majority of deployment situations.

Another object of the present invention is to provide a non-venting air bag for protecting the occupant of a motor vehicle in the majority of crash situations wherein a change in air quality and/or air pressure from the norm is particularly undesirable.

Another object of the present invention is to provide an air bag system that is reliable in operation.

Another object of the present invention is to provide an air bag system that is simple to manufacture.

Another object of the present invention is to provide an air bag system that is economical to manufacture.

Another object of the present invention is to provide an air bag that is lightweight relative to other air bags.

Another object of the present invention to provide an air bag system that is compatible with existing vehicle equipment.

DETAILED DESCRIPTION OF PREFERRED EMBODIMENTS OF THE PRESENT INVENTION

Figure 1:
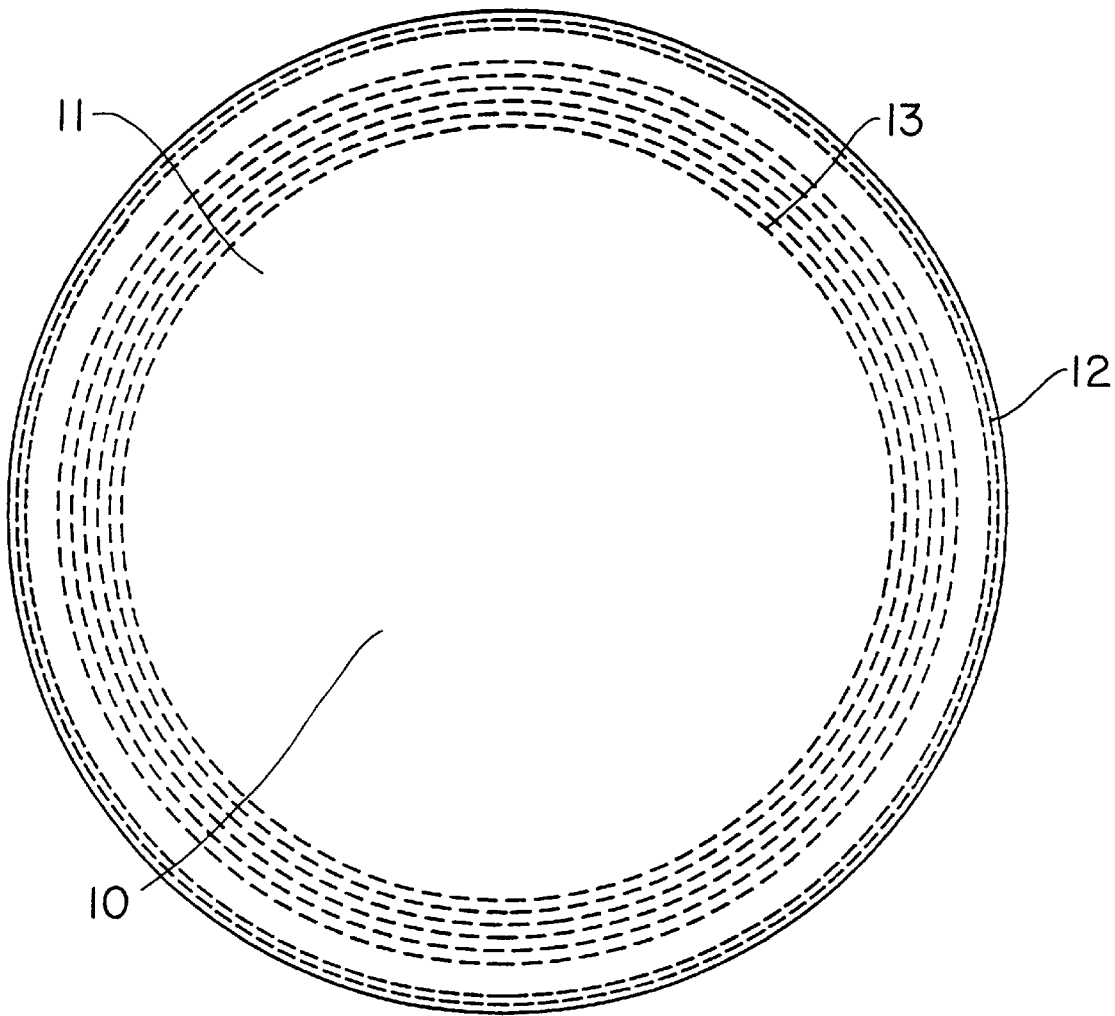
FIG. 1 is a schematic diagram of the front view of the front panel of an uninflated driver-side air bag of the present invention.
Figure 2:
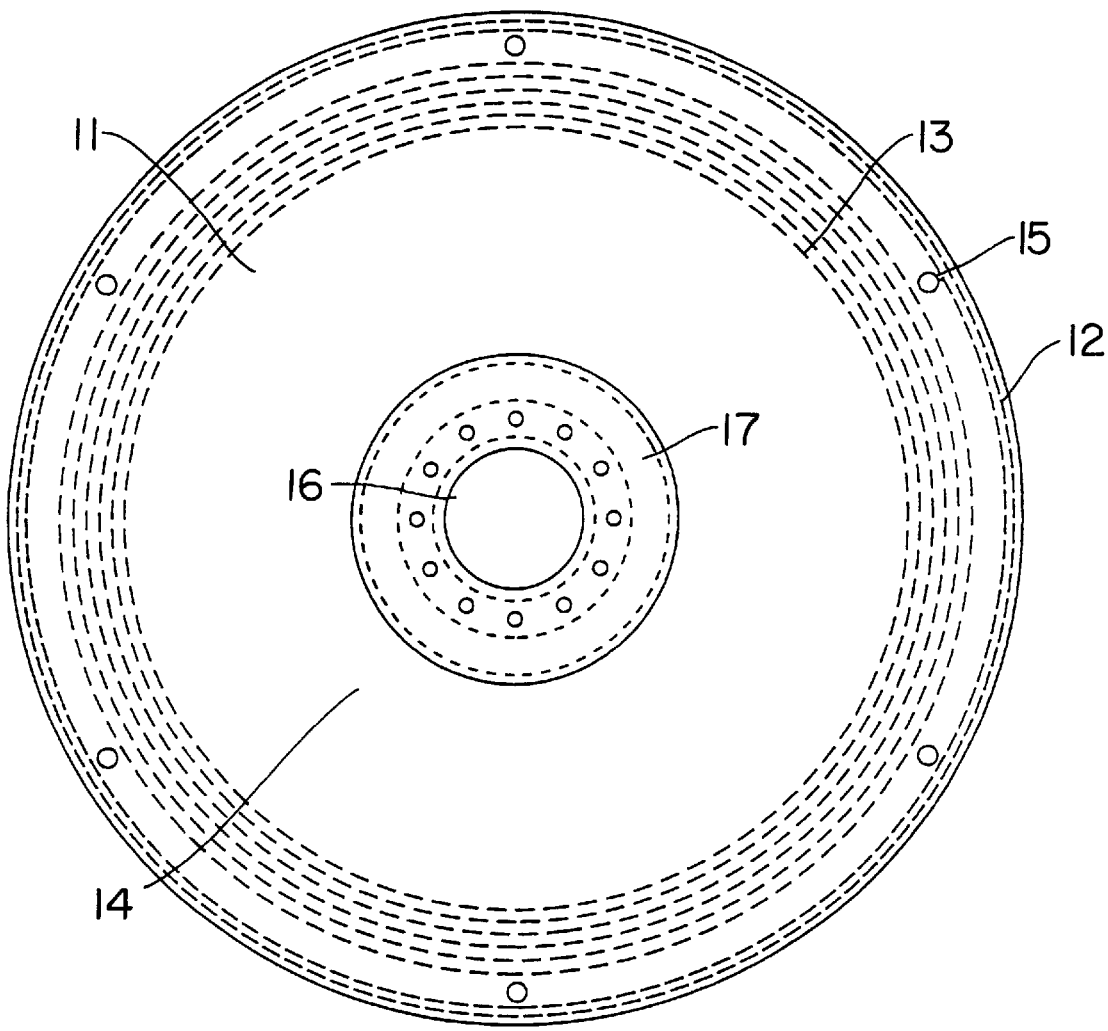
FIG. 2 is a schematic diagram of the back view of the rear panel of an uninflated driver-side air bag of the present invention.
Figure 5:
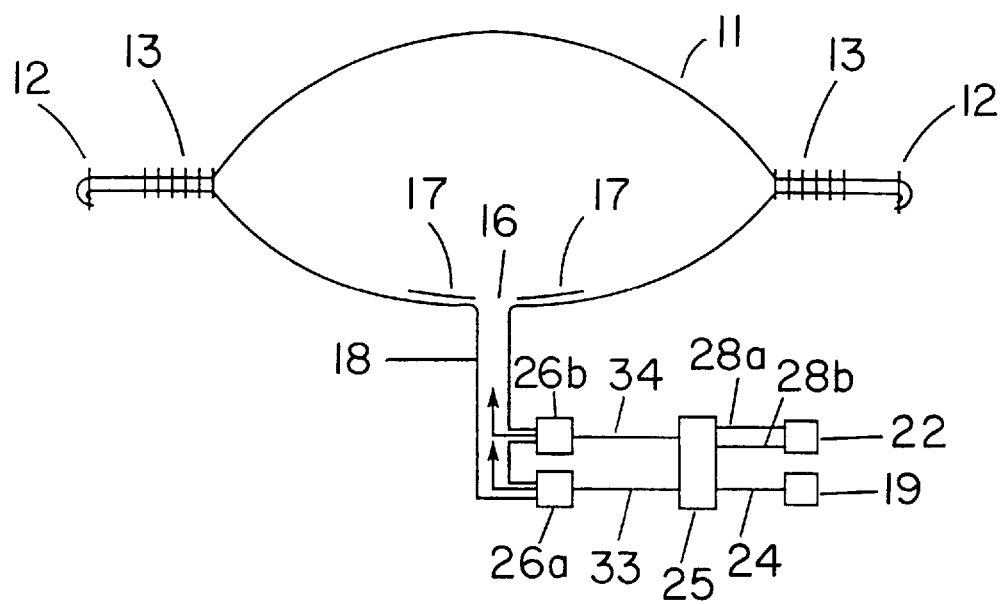
FIG. 5 is a schematic diagram of the top section view of the present invention showing the small volume of the air bag inflated of the second preferred embodiment of the present invention.
Figure 6:
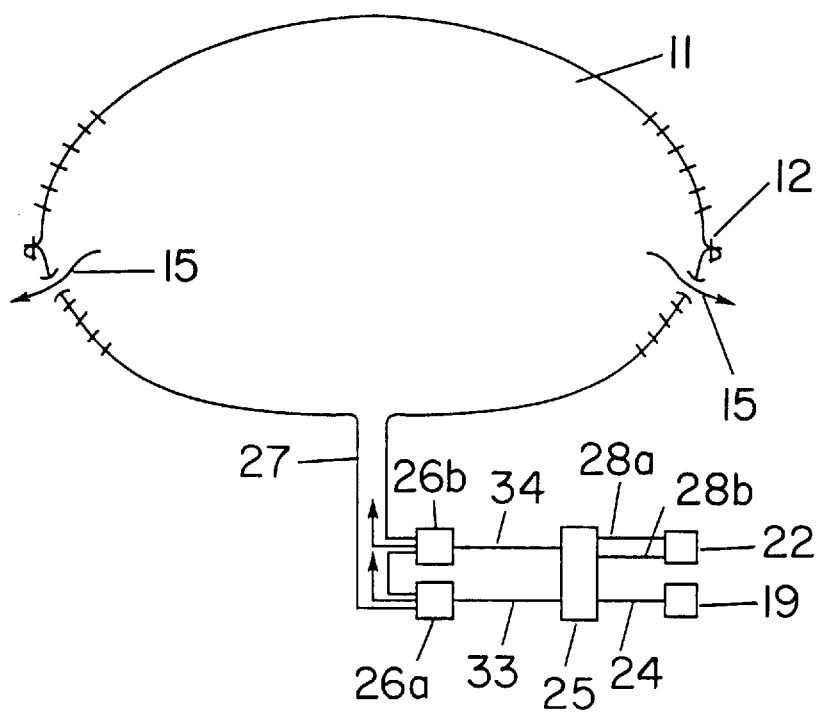
FIG. 6 is a schematic diagram of the top section view of the present invention showing the large volume of the air bag inflated of the second preferred embodiment of the present invention.

The preferred embodiment of the uninflated driver's-side air bag of the present invention is shown in FIGS. 1 and 2. FIGS. 3–4 and 5–6 show the present invention with the small air bag volume inflated and the large air bag volume inflated for an inflation system that employs a bypass valve (FIGS. 3–4) and one that employs two gas generators (FIGS. 5–6). These figures show a round configuration for driver-side use. However, the air bag of the present invention may utilize any functional shape including oblong, square, and rectangular for driver-side or passenger-side use. Although only front and back panels are shown in detail and described herein, the air bag of the present invention can also have side panels. Regardless of the configuration, the overall size of the air bag of the present invention is typical of air bags manufactured today. For example, for driver-side use, the present invention in a round configuration, such as shown in FIGS. 1–2, has a flat, uninflated diameter of approximately 27 to 30 inches. The air bag material is also conventional. For example, the material of air bag 11 can be a woven nylon fabric of 420 denier coated inside with neoprene.

FIGS. 1 and 2 show the air bag front 10 and rear 14 panels, respectively. These panels are joined peripherally such that a seam is created along the outside edge. Alternately, the panels can be joined such that the seam is inside the air bag. Preferably, the panels are joined by high-strength stitching 12. However, other means of attachment such as adhesion and high-frequency welding may also be used. Stitching 12 is comprised of approximately two closely set lines of straight horizontally-applied stitches that can withstand pressure of at least 20 psig before breaking. Other high-strength stitching patterns can be applied. Preferably, the thread of stitching 12 is 420 denier nylon thread, and the stitches are applied in the range of 7 to 10 per inch.

Breakaway stitching 13 defines a central area within the air bag 11 and can withstand a pressure of approximately 7 psig before breaking. It is made preferably of 1.8 lb. breaking-strength nylon thread with stitches applied in a range of 10 to 18 per inch. The small inflatable volume is defined by the expanse of unstitched area that is bordered by the innermost breakaway stitching 13 line. This volume is approximately 50 percent of the inflated volume of the entire air bag 11.

FIG. 2 shows vent holes 15 located on the air bag rear panel 14 within the unstitched expanse between stitching 12 and breakaway stitching 13. Together, these vent holes provide approximately one to two square inches of vent area. The rear panel 14 also has an inflation gas inlet 16. Surrounding the gas inlet 16 is a reinforcement 17 that is adapted to couple to the inflation system. The exact configuration of the inlet 16 and reinforcement 17 is dependent on the configuration of the inflation system connector 18 that is used.

Figure 3:
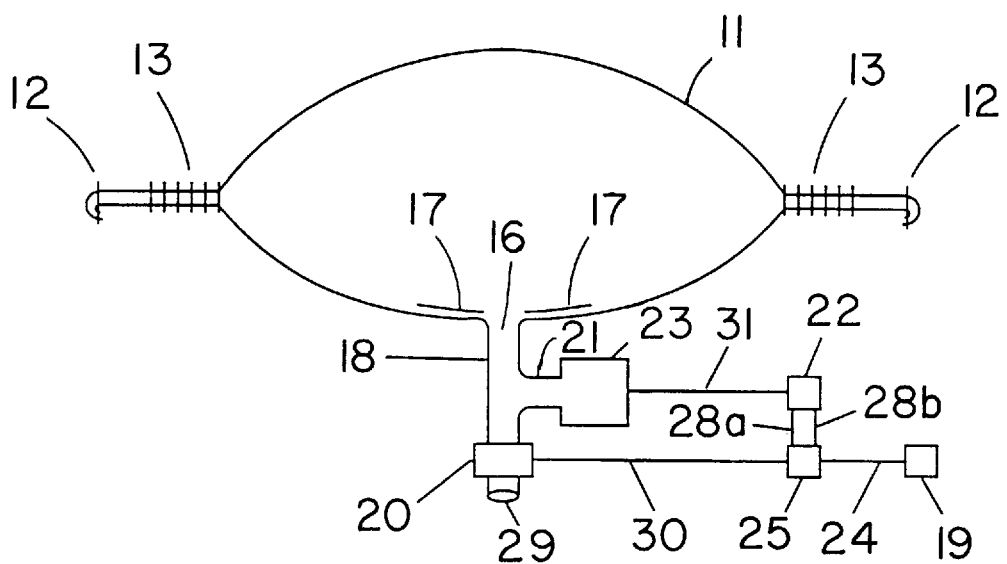
FIG. 3 is a schematic diagram of the present invention showing the small volume of the air bag inflated of the first preferred embodiment of the present invention.
Figure 4:
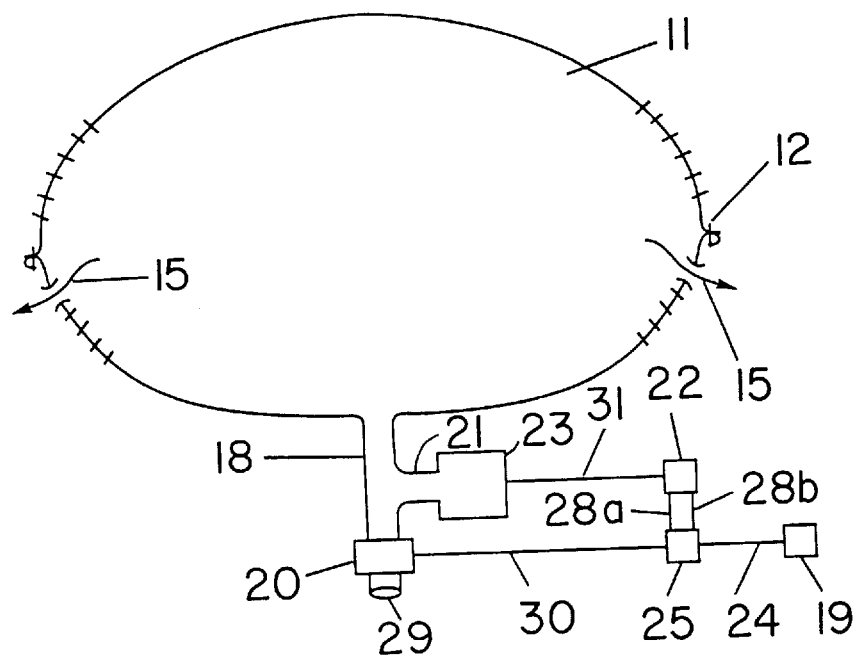
FIG. 4 is a schematic diagram of the top section view of the present invention showing the large volume of the air bag of the first preferred embodiment of the present invention.

The first preferred embodiment of the present invention is shown in FIGS. 3 and 4. It includes a bypass valve 20 with a port 29. The valve 20 is attached via a fluid connector 18 to the gas inlet 16 and reinforcement 17. The bypass valve 20 is also attached via fluid connector 21 to a conventional gas generator 23. Bypass valve 20 is electrically connected to signal processor 25 via wire 30. The signal processor 25 is electrically connected to the seat belt usage sensor 19 via wire 24. Whenever the occupant engages his/her seat belt, the seat belt usage sensor 19 sends one type of signal via wire 24 to the signal processor 25 which then sends a signal via wire 30 that causes the valve 20 to open. Whenever the occupant disengages his/her seat belt, the seat belt usage sensor 19 sends a different signal via wire 24 to the signal processor 25 which signals the bypass valve 20 to close via wire 30.

The signal processor 25 is also electrically connected to the crash sensor 22 via wires 28a and 28b. In general, the crash sensor 22 detects changes in acceleration over a set time frame. A crash is defined as a change of acceleration over a time frame that surpasses or is greater than a set change of acceleration over a set time frame, known as a speed threshold. The crash sensor 22 of the present invention is sensitive and responsive to two crash speed thresholds: a moderate threshold when the crash speed is greater than 12 mph and a severe threshold when the crash speed is greater than 20 mph. The sensor 22 identifies the crash speed threshold and relays that information via wires 28a and 28b to the signal processor 25.

If the crash speed threshold is moderate, only wire 28a will send a signal to processor 25. If the crash speed threshold is severe, both wires 28a and 28b will send a signal to the processor 25. The crash sensor 22 is also electrically connected via wire 31 to a conventional gas generator 23. When the sensor 22 detects a crash, it simultaneously sends a signal via wire 31 to the gas generator 23 which initiates gas generation and to the signal processor 25 via wires 28a and 28b.

The signal processor 25 evaluates the latest input from the seat belt usage sensor 19 and the input from the crash sensor 22. Via wire 30, the signal processor 25 either sends no signal, leaving the bypass valve 20 either fully open or fully closed, or it sends a signal that will partially open or partially close the bypass valve 30, depending on the belted condition of the occupant and the crash speed threshold. If the crash speed is moderate and the occupant is belted, the signal processor 25 sends no signal to the bypass valve 20, allowing it to remain fully open. If the crash speed is severe and the occupant is belted or the crash speed is moderate and the occupant is not belted, the signal processor 25 sends a signal that causes the bypass valve 20 to be partially open by moving from a fully closed position or from a fully open position to a partially open position. If the crash speed is severe and the occupant is unbelted, the signal processor 25 sends no signal to the bypass valve 20, allowing it to remain fully closed.

Another preferred inflation system of the present invention is shown in FIGS. 5 and 6. It comprises crash and seat belt usage sensors, 22 and 19 respectively; a signal processor 25; and two conventional air bag gas generators 26a and 26b. The two gas generators 26a and 26b have different outputs, preferably approximately 40 percent and 60 percent of total, so that the small central volume can be inflated to soft or hard conditions and so that together the two generators 26a and 26b will produce enough gas to fully inflate the large inflatable volume of air bag 11. Preferably, gas generator 26a is the larger generator, and gas generator 26b is the smaller generator. The crash sensor 22 is electrically connected to the signal processor 25 via wires 28a and 28b. The seat belt usage sensor 19 is electrically connected to the processor 25 via wire 24. The signal processor 25 is electrically connected to gas generators 26a and 26b via wires 33 and 34, respectively. The generators 26a and 26b are fluidly connected via fluid connector 27 to the air bag gas inlet 16 and reinforcement 17.

The crash sensor 22, seat belt usage sensor 19, and signal processor 25, and their attaching wires function as described in the description of the above inflation system with the following exception. In the event of a crash, the signal processor 25 evaluates the inputs from the seat belt usage sensor 19 and crash sensor 22, and sends a signal to one or both of the gas generators 26a and 26b that initiates inflation. These inputs define the specific circumstances of the crash in terms of crash speed threshold and belted condition of the occupant. If the occupant is belted and the crash speed threshold is moderate, the signal processor 25 will signal the smaller gas generator 26b to initiate inflation. If the occupant is belted and the crash speed threshold is severe, or if the occupant is unbelted and the crash speed threshold is moderate, the signal processor 25 will signal the larger gas generator 26a to initiate inflation. If the occupant is unbelted and the crash speed threshold is severe, the processor 25 will signal both gas generators 26a and 26b to initiate inflation. Only in the latter situation will the gas break the breakaway stitching 13 and inflate the air bag's large inflatable volume.

Alternative Embodiments of the Invention

The present invention can also be implemented in alternative embodiments to the embodiments described above. A first alternative embodiment is an air bag system that uses only seat belt usage as a discriminator, instead of both seat belt usage and crash speed threshold, is an alternate, low-cost embodiment of the present invention which would result in a low aggressivity air bag being deployed 75 out of 100 crash situations. A second alternative embodiment includes, in addition to the crash speed sensor and the seat belt usage sensor, a sensor which responsive to the position of the seat. If the seat is in a forward position (as would be the case for a short, e.g., 5' 1", driver), the air bag deployment would use low aggressivity. A third alternative embodiment includes, in addition to the crash speed sensor and the seat belt usage sensor, a sensor responsive to the weight of the occupant, and the air bag system could factor in the occupant weight in determining the size and aggressivity of the air bag deployment.

The foregoing disclosure of the present invention has been presented for the purposes of illustration and description. It is not intended to be exhaustive or to limit the invention to the precise forms disclosed. In particular, the present invention can be used in ground, sea, or air vehicles in addition to automobiles. For example, the present invention may be used in trains, trucks, buses, vans, boats, ships, and aircraft. Many variations and modifications of the invention described herein will be obvious to one of ordinary skill in the art in light of the above disclosure, in addition to the modifications described above.

What is claimed is:

1. An air bag system comprising:

(a) a seat belt comprising a seat belt usage sensor;

(b) an air bag partitioned into separate sections by at least one releasable partition, said at least one releasable partition providing at least a first smaller volume and a second larger volume;

(c) an inflation system for inflating said air bag to either the first or the second volume, by using a variable amount of inflating gas such that the air bag is inflated to the first smaller volume when a first smaller amount of inflating gas is selected, and to the second larger volume when a second larger amount of inflating gas is selected, said second larger amount of inflating gas providing sufficient pressure in the air bag such that the releasable partition is released and the air bag inflates to the larger second volume;

(d) a crash sensor responsive to at least a first crash speed threshold and a second crash speed threshold; and (e) a signal processor electrically connected to the crash sensor and to the seat belt usage sensor, wherein the signal processor selects one of said at least first and second volumes and the amount of inflating gas as follows:

(i) if the seat belt is engaged, and the crash sensor indicates that the crash speed is above the first crash speed threshold but below the second crash speed threshold, the first smaller amount of inflating gas is selected;

(ii) if the seat belt is not engaged and the crash sensor indicates that the crash speed is above the second crash speed threshold, the second larger amount of inflating gas is selected.

2. The air bag system of claim 1, wherein a third intermediate amount of inflating gas may be selected by the signal processor, said third intermediate amount of inflating gas not providing sufficient pressure in the air bag to release the releasable partition, and wherein the third intermediate amount of inflating gas is selected in the event of a crash occurring at a crash speed above the first crash speed threshold and below the second crash speed threshold when the seat belt is not engaged.

3. The air bag system of claim 2, wherein said third intermediate amount of inflating gas is selected in the event of a crash occurring above the second crash speed threshold when the seat belt is engaged.

4. The air bag system of claim 2, wherein said air bag comprises a first section and a second section separated by said releasable partition, and wherein said second section has a volume larger than said first section.

5. The air bag system of claim 4, wherein said inflation system inflates said first section prior to inflating said second section.

6. The air bag system of claim 3, wherein wherein the first smaller amount of inflating gas is sufficient to inflate the air bag to the first smaller volume at a first lower pressure and the third intermediate amount of inflating gas is sufficient to inflate the air bag to the first smaller volume at a second higher pressure.

7. The air bag system of claim 6, wherein said first section is contained inside said second section.

8. The air bag system of claim 1, further comprising a bypass valve electrically connected to said signal processor, wherein said bypass valve is controlled by the signal processor to select the amount of inflating gas that is used to inflate the air bag.

9. The air bag system of claim 8, wherein the bypass valve comprises a fully open position, a partially open position, and a fully closed position, and wherein the signal processor provides a signal to the bypass valve which sets the bypass valve to one of the fully open position, partially open position, and fully closed position.

10. The air bag system of claim 1, wherein said inflation system comprises:
  (c)(i) a first gas generator electronically connected to said signal processor for generating the first smaller amount of inflating gas; and
  (c)(ii) a second gas generator electronically connected to said signal processor for generating a third intermediate amount of inflating gas, wherein the total amount of gas generated by the first and second gas generators is the second larger amount of inflating gas,
  wherein the third intermediate amount of inflating gas does not provide sufficient pressure to release the releasable partition, and
  wherein said signal processor transmits signals to said first and second gas generators to initiate the generation of inflating gas by said first gas generator only when the seat belt is engaged and the crash sensor indicates that the crash speed is above the first crash speed threshold but below the second crash speed threshold and to initiate the generation of inflating gas by both said first gas generator and said second gas generator when the seat belt is not engaged and the crash speed is above the second crash speed threshold.

11. The air bag system of claim 10,
  wherein said first smaller amount of inflating gas is sufficient to inflate said first smaller volume at said first lower pressure, said third intermediate amount of inflating gas is sufficient to inflate said first smaller volume at a second higher pressure, and
  wherein said second larger amount of inflating gas is sufficient to release the releasable partition and to fully inflate the air bag to said second larger volume.

12. The air bag system of claim 2, further comprising a seat position sensor electrically connected to the signal processor, wherein the signal processor selects the first smaller amount of inflating gas or the third intermediate amount of inflating gas if the seat is in a forward position, even if the crash sensor indicates that the crash speed is above the second crash speed threshold.

13. The air bag system of claim 2, further comprising a sensor responsive to the weight on a seat electrically connected to the signal processor, wherein the signal processor selects the first smaller amount of inflating gas or the third intermediate amount of inflating gas if the weight on the seat is below a predetermined limit, even if the crash sensor indicates that the crash speed is above the second crash speed threshold.

14. A method for inflating an air bag in a vehicle having an air bag system comprising
  an air bag partitioned into a plurality of sections by at least one releasable partition,
  a crash sensor responsive to a plurality of crash speed thresholds,
  a seat belt usage sensor, a signal processor electrically connected to the seat belt usage sensor and to the crash sensor, and a
  gas generating system electrically connected to the signal processor for inflating the air bag with a plurality of amounts of inflating gas,
  wherein the signal processor carries out the following steps:
    (a) monitoring the seat belt usage;
    (b) receiving signals from the crash sensor indicating a crash and a crash speed threshold; and
    (c) inflating the air bag to a volume determined by the seat belt usage and the crash speed threshold, using an amount of inflating gas determined by the seat belt usage and the crash speed threshold as follows:
      (i) if the seat belt is engaged, and the crash sensor indicates that the crash speed is above the first crash speed threshold but below the second crash speed threshold, selecting the first smaller amount of inflating gas and inflating the air bag to a first smaller volume at a first lower pressure;
      (ii) if the seat belt is not engaged and the crash sensor indicates that the crash speed is above the second crash speed threshold, selecting the second larger amount of inflating gas,
  wherein the second larger amount of inflating gas inflates the air bag at such a pressure that the releasable partition is released, allowing the air bag to inflate to a second larger volume.

15. The method of claim 14, further comprising the step of:
  selecting a third intermediate amount of inflating gas and inflating the air bag to the first smaller volume at a second higher pressure if (i) the crash occurs at a crash speed above the second crash speed threshold and the seat belt is engaged or (ii) if the crash speed occurs above the first crash speed threshold but below the second crash speed threshold and the seat belt is not engaged.

16. The method of claim 15, wherein said gas generating system has a plurality of gas generators, wherein each gas generator can generate an amount of inflating gas, wherein the total amount of generating gas generated by said plurality of gas generators is sufficient to fully inflate the air bag.

17. The method of claim 15, wherein said gas generating system has a plurality of generators comprising a first and a second gas generator, and wherein said first gas generator has a gas generation capacity that is sufficient to fully inflate said first section of the air bag.

18. The method of claim 17, wherein said second gas generator has a gas generation capacity that, when added to the amount of gas generated by the first gas generator, is sufficient to fully inflate the air bag.

19. The method of claim 14, wherein said air bag system comprises a bypass valve electrically connected to said signal processor, wherein said bypass valve is controlled by the signal processor to select the amount of inflating gas that is used to inflate the air bag.

20. The method of claim 19, wherein the bypass valve comprises a fully open position, a partially open position, and a fully closed position, and wherein the signal processor provides a signal to the bypass valve which sets the bypass valve to one of the fully open position, partially open position, and fully closed position.

21. An air bag system, comprising:
(a) a seat belt comprising a seat belt usage sensor;
(b) an air bag having at least a first volume and a second volume;
(c) a variable-output gas generator system for inflating said air bag to either the first or the second volume, wherein the gas generator system introduces one of a first, a second, and a third amount of inflating gas into the air bag;
(d) a crash sensor responsive to at least a first crash speed threshold and a second crash speed threshold; and
(e) a signal processor electrically connected to the crash sensor and to the seat belt usage sensor,
wherein the signal processor controls the inflation of the air bag such that:
  (i) if the seat belt is engaged and the crash speed is above the first crash speed threshold and below the second crash speed threshold, the air bag is inflated to the first volume at a first lower pressure using the first amount of inflating gas,
  (ii) if the seat belt is engaged and the crash speed is above the second crash speed threshold, the air bag is inflated to the first volume at a second higher pressure using the second amount of inflating gas;
  (iii) if the seat belt is not engaged, and the crash speed is above the first crash speed threshold and below the second crash speed threshold, the air bag is inflated to the first volume at the second higher pressure using the second amount of inflating gas; and
  (iv) if the seat belt is not engaged and the crash speed is above the second crash speed threshold, the air bag is inflated to the second volume using the third amount of inflating gas.

22. The air bag system of claim 21, wherein the variable-output gas generator system comprises a bypass valve, fluidly connected to the air bag and to a gas generator, having a fully open position, a partially open position, and a fully closed position, and wherein the signal processor is electrically connected to the bypass valve to control the position of the bypass valve to provide the first, second or third amount of inflating gas.

23. The air bag system of claim 22, wherein the signal processor controls the bypass valve to:
introduce the first amount of inflating gas into the air bag by setting the bypass valve to the fully open position,
introduce the second amount of inflating gas into the air bag by setting the bypass valve to the partially open position, and
introduce the third amount of inflating gas into the air bag by setting the bypass valve to the fully closed position.

24. The air bag system of claim 21, wherein the variable-output gas generator system comprises a first gas generator electrically connected to the signal processor capable of generating a first amount of inflating gas, and a second gas generator capable of generating a second amount of inflating gas,
wherein said signal processor controls the first and second gas generators to produce the first, second and third amounts of inflating gas.

25. The air bag system of claim 21, wherein said first volume and said second volume are defined by a first section and a second section of the air bag.

26. The air bag system of claim 25, comprising breakaway material that resists breaking until said gas generating system inflates the first section of the air bag at the first lower pressure using the first amount of inflating gas, inflates the first section of the air bag at the second higher pressure using the second amount of inflating gas, and wherein said breakaway material breaks away after the first section is fully inflated to allow inflation of the second section of the air bag using the third amount of inflating gas.

27. The air bag system of claim 25, wherein said first section is contained inside said second section.

28. The air bag system of claim 25, wherein said breakaway material comprises breakaway stitching.

29. The air bag system of claim 21, further comprising a seat position sensor, wherein the signal processor also considers the seat position in determining whether to inflate the air bag to the first or to the second volume, and in determining whether to introduce the first amount, the second amount or the third amount of inflating gas into the air bag.

30. The air bag system of claim 1, further comprising a sensor responsive to the weight on a seat, wherein the signal processor also considers the weight on the seat in determining whether to inflate air bag to the first or to the second volume, and in determining whether to introduce the first amount, the second amount or the third amount of inflating gas into the air bag.

31. An air bag system comprising:
(a) a seat belt comprising a seat belt usage sensor;
(b) an air bag having at least a first volume and a second volume, wherein said first volume is defined by a first section of the air bag, wherein a second section of the air bag is separated from the first section by a breakaway material, and wherein the second volume is the sum of the volumes of the first section and the second section;
(c) an inflation system for inflating said air bag to either the first or the second volume, using at least a first, a second or a third amount of inflating gas;
(d) a crash sensor system comprising a crash detector and a speed indicator; and
(e) a signal processor electrically connected to the crash sensor and to the seat belt usage sensor,
wherein the signal processor initiates deployment of the air bag upon receiving a signal from the crash detector indicating that a crash is occurring, and wherein the signal processor selects one of said first and second volumes and the first, second or third amounts of inflating gas as follows:
  (i) if the seat belt is engaged and the crash speed is above the first crash speed threshold and below the second crash speed threshold, the air bag is inflated to the first volume at a first lower pressure using the first amount of inflating gas,
  (ii) if the seat belt is engaged and the crash speed is above the second crash speed threshold, the air bag is inflated to the first volume at a second higher pressure using the second amount of inflating gas;
  (iii) if the seat belt is not engaged, and the crash speed is above the first crash speed threshold and below the second crash speed threshold, the air bag is inflated to the first volume at the second higher pressure using the second amount of inflating gas; and
  (iv) if the seat belt is not engaged and the crash speed is above the second crash speed threshold, the air bag is inflated to the second volume using the third amount of inflating gas by breaking away the breakaway material separating the first section from the second section.

32. The air bag system of claim 31, wherein said air bag comprises a plurality of sections, each of said sections having a volume that can be inflated by said inflation system.

33. The air bag system of claim 32, further comprising breakaway material separating said plurality of sections that resists breaking until said inflation system fills one or more sections of the air bag.

34. The air bag system of claim 32, wherein said first amount of inflating gas is sufficient to fill said first section at the first lower pressure, said second amount of inflating gas is sufficient to fill said first section at the second higher pressure, and said third amount of inflating gas is sufficient to completely fill said first and second sections.

35. The air bag system of claim 34, wherein said inflation system inflates said first section prior to inflating said second section.

36. The air bag system of claim 35, wherein said breakaway material breaks when said first section has been filled by said inflation system, thereafter allowing said inflation system to fill said second section.

37. The air bag system of claim 36, wherein said first section is contained inside said second section.

38. The air bag system of claim 31, further comprising a bypass valve electrically connected to said signal processor, wherein said bypass valve is controlled by the signal processor to select the amount of inflating gas that is used to inflate the air bag.

39. The air bag system of claim 38, wherein the bypass valve comprises a fully open position, a partially open position, and a fully closed position, and wherein the signal processor provides a signal to the bypass valve which sets the bypass valve to one of the fully open position, partially open position, and fully closed position to select the first amount of inflating gas, the second amount of inflating gas or the third amount of inflating gas, respectively.

40. The air bag system of claim 31, wherein said inflation system comprises:
(c)(i) a first gas generator electrically connected to said signal processor for generating the first amount of inflating gas; and
(c)(ii) a second gas generator electrically connected to said signal processor for generating the second amount of inflating gas,
wherein the third amount of inflating gas is the total of the first and second amounts of inflating gas, such that the third amount of inflating gas is generated by initiating inflation of both the first and second gas generators, and
wherein said signal processor transmits signals to said first and second gas generators to initiate the generation of inflating gas by said first and second gas generators.

41. The air bag system of claim 40, wherein said air bag comprises:
(b)(i) a first section having the first volume; and
(b)(ii) a second section, wherein the second volume is the sum of the volumes of the first and second sections, and wherein said first amount of inflating gas is sufficient to inflate said first volume at the first lower pressure,
said second amount of inflating gas is sufficient to inflate said first volume at the second higher pressure, and
wherein said third amount of inflating gas is sufficient to fully inflate said second volume.

42. The air bag system of claim 31, further comprising a seat position sensor, wherein the signal processor selects the first or second amounts of inflating gas of inflating gas if the seat is in a forward position, even if the crash sensor indicates that the crash speed is above the second crash speed threshold.

43. The air bag system of claim 31, further comprising a sensor responsive to the weight on a seat, wherein the signal processor selects the first smaller amount of inflating gas or the third intermediate amount of inflating gas if the weight on the seat is below a predetermined limit, even if the crash sensor indicates that the crash speed is above the second crash speed threshold.

44. An air bag system, comprising:
(a) an air bag having at least a first volume defined by a first section of the air bag and a second volume defined by the sum of the first section of the air bag and a second section of the air bag, said first and second sections of the air bag being separated by a releasable partition;
(b) an inflation system for inflating said air bag to either the first or the second volume using a first, a second, or a third amount of inflating gas;
(c) a seat belt system comprising a seat belt usage sensor;
(d) a seat position sensor;
(e) a signal processor coupled to said air bag, a crash speed sensor and to said inflation system for inflating said air bag when said signal processor detects a crash as follows:
(i) if the seat belt is engaged and the crash speed is above the first crash speed threshold and below the second crash speed threshold, the air bag is inflated to the first volume at a first lower pressure using the first amount of inflating gas,
(ii) if the seat belt is engaged and the crash speed is above the second crash speed threshold, the air bag is inflated to the first volume at a second higher pressure using the second amount of inflating gas;
(iii) if the seat belt is not engaged, and the crash speed is above the first crash speed threshold and below the second crash speed threshold, the air bag is inflated to the first volume at the second higher pressure using the second amount of inflating gas;
(iv) if the seat belt is not engaged and the crash speed is above the second crash speed threshold and the seat position sensor indicates that the seat is not in a forward position, the air bag is inflated to the second volume using the third amount of inflating gas, wherein the third amount of inflating gas provides sufficient pressure to release the releasable partition and to allow the inflating gas to enter the second section of the air bag; and
(v) if the seat belt is not engaged and the crash speed is above the second crash speed threshold and the seat position sensor indicates that the seat is in a forward position, the air bag is inflated to the first volume using the second amount of inflating gas.

45. The air bag system of claim 44, wherein the first section of the air bag is a central portion of the entire air bag, releasably partitioned from the remaining portion of the air bag.

46. The air bag system of claim 45, wherein the first section of the air bag is releasably attached to the air bag using breakaway stitching.

47. The air bag system of claim 45, wherein the air bag has a circular cross-section, and the first section of the air bag also has a circular cross-section.

48. The air bag system of claim 47, wherein the center of the circular cross-section of the first section of the air bag is approximately coincident with the center of the circular cross-section of the air bag.

* * * * *